United States Patent [19]
Tran

[11] Patent Number: 5,453,987
[45] Date of Patent: Sep. 26, 1995

[54] RANDOM ACCESS PROTOCOL FOR MULTI-MEDIA NETWORKS

[75] Inventor: Hai V. Tran, Falls Church, Va.

[73] Assignee: The Mitre Corporation, Bedford, Mass.

[21] Appl. No.: 196,548

[22] Filed: Feb. 15, 1994

[51] Int. Cl.$^6$ .................................. H04L 12/413
[52] U.S. Cl. ................. 370/85.3; 370/85.6; 370/85.7; 370/95.3; 370/19; 370/94.2
[58] Field of Search ................. 370/85.1, 85.2, 370/85.3, 85.6, 93, 94.1, 94.2, 85.7, 95.1, 95.3, 18, 19, 21, 69.1

[56] References Cited

U.S. PATENT DOCUMENTS

| | | | |
|---|---|---|---|
| 4,516,239 | 5/1985 | Maxenchuk | 370/85.3 |
| 4,598,285 | 7/1986 | Hoshen | 370/85.2 |
| 4,949,336 | 8/1990 | Hamada et al. | 370/85.2 |

*Primary Examiner*—Hassan Kizou
*Attorney, Agent, or Firm*—Morton J. Rosenberg; David I. Klein

[57] ABSTRACT

A protocol for mixed voice and data access to a synchronous broadcast communications channel (116) is provided. Transmission on the broadcast communications channel (116) is by means of a plurality of time division frames, each such frame being defined by a plurality of time slots (210). The protocol requires that a user determine whether a time slot is available. If a slot is available, a user transmits a preamble (212) on the broadcast communications channel and then substantially simultaneously monitors the channel for determining whether a collision of the preamble has occurred. If a collision has occurred with a second user who has a higher priority, the first user reattempts to acquire an available time slot after a time delay, the time delay being equivalent to a random number of time slots. If on the other hand, the collision was with a second user of equal priority, both users will reattempt acquisition of available time slots after respective random time delays. The preambles of users of different priority are transmitted using a non-interfering code or modulation frequency, thereby allowing the higher priority user to continue transmission of the remaining fields which make up that user's information packet. Another key feature of the protocol is the use of the preamble (212) to identify voice users that are in silence periods, transmitting no data. Under these circumstances, the protocol permits data users to utilize such identified time slots when they are encountered, thereby increasing the throughput of the data communications system.

15 Claims, 7 Drawing Sheets

RANDOM ACCESS PROTOCOL FOR MULTI-MEDIA NETWORKS

BACKGROUND OF THE INVENTION

FIELD OF THE INVENTION

This invention directs itself to a protocol for communication on a synchronous broadcast communications channel, such as in multi-media networks. In particular, this invention directs itself to a protocol for mixed voice and data transmission on a synchronous broadcast communications channel. More in particular, this invention directs itself to a protocol wherein both voice and data users contend for any of the time slots of a time division frame. Further, the protocol makes use of a plurality of bits in a preamble which is transmitted with every packet to identify the status of the time slot and the priority of the user. Still further, the protocol permits data users to utilize time slots reserved for a voice user, when that voice user is in a silence period, to thereby increase the throughput of the communications network.

PRIOR ART

Mixed voice and data communications protocols are well known in the art. Such prior art multiple access protocols are typically categorized as being of the fixed assignment, demand assignment, or random access type of protocol, or some combination thereof. In the fixed assignment protocol, the channel resources are allocated to users independent of network activity, by partitioning the time-bandwidth domain and allocating specific portions thereof for each class of user. Thus, if all of the allocated data time slots are currently utilized, an additional data user cannot obtain access to the communications channel, even though time slots allocated to voice users are available. Therefore, these types of systems become very inefficient and introduce significant delays in transmission of data, such users usually being allocated a smaller proportion of the time slots, since voice users are more sensitive to delays.

The aforesaid disadvantage of fixed assignment protocols is attempted to be overcome by demand assignment protocols. A demand assignment protocol requires that explicit information regarding the need for the communications resource be exchanged. The demand assignments are then made by a central controller, or distributed in the form of a common algorithm executed by all stations. However, the addition of a central controller adds to the system complexity, and introduces a delay in transmission of information from one terminal to another within the network. Where such control is distributed among all the stations, the complexity of the network is substantially increased, as is transmission delays.

In random access protocols, voice and data communicate over a common "free for all" multi-access broadcast channel. Such systems are commonly referred to as ALOHA systems which are fixed random access schemes, or CSMA/CD protocols, as commonly utilized in Ethernet LANs. However, none of the aforesaid protocols offer the throughput and simplicity of the instant invention.

U.S. Pat. No. 4,161,786 discloses a prior art system directed to time division multiple access communications, the system having a plurality of subscriber terminals coupled to a communications channel, and is hereby incorporated by reference into the present application. The reference discloses a distributed queue dual bus architecture which is a version of the moving boundary approach to integration of voice and data. The time division frame is divided into two subframes, one for allocation to one class of traffic and the other for contention between the classes. Thus, this reference discloses a strategy of dedicated resources with dynamic allocation limited to only the contention subframe. It is further noted that this reference utilizes the preamble for each data packet only for synchronization, and does not suggest or disclose the use of the preamble to convey information about the channel state and priorities of the traffic class transmitting that preamble.

Other prior art references directed to communications protocols and packetized communications known to the Applicant include U.S. Pat. Nos. 4,512,011; 4,539,676; 4,965,792; 4,979,168; 4,987,571; 5,012,467; 5,012,469; 5,023,870; 5,051,985; 5,072,444; 5,079,766; 5,113,391; 5,124,984; 5,130,984; 5,164,942; 5,166,929; and, 5,177,740.

SUMMARY OF THE INVENTION

A method for randomly accessing a multi-media communications network defined by a common signal path and a plurality of voice and data terminals coupled to the common signal path for communication thereon is provided. The method includes a first step of providing a plurality of sequential time slots for transmission of a plurality of information packets, each of the information packets having a length equal to a length of a representative one of the plurality of time slots. Next, each of the time slots is provided with an access field, an address-control field and an information field. The access field of each of the plurality of time slots is next monitored for identifying a null time slot that is (1) in non-communication with any of the voice or data terminals, or (2) reserved for a voice terminal in a silence period. The next step of the method is to transmit a preamble to an access field of the identified null time slot. That transmission step is followed by the step of monitoring the transmission of the preamble for collisions between terminals competing for the identified null time slot. If no collision is detected, address data and information bits are transmitted in the respective fields of the identified null time slot and a respective time slot in subsequent data frames. If a collision is detected, then the method returns to the step of monitoring the access field of each of a plurality of time slots for identifying another null time slot, and then repeating the steps which are subsequent thereto.

DESCRIPTION OF THE PREFERRED EMBODIMENTS

Figure 1:
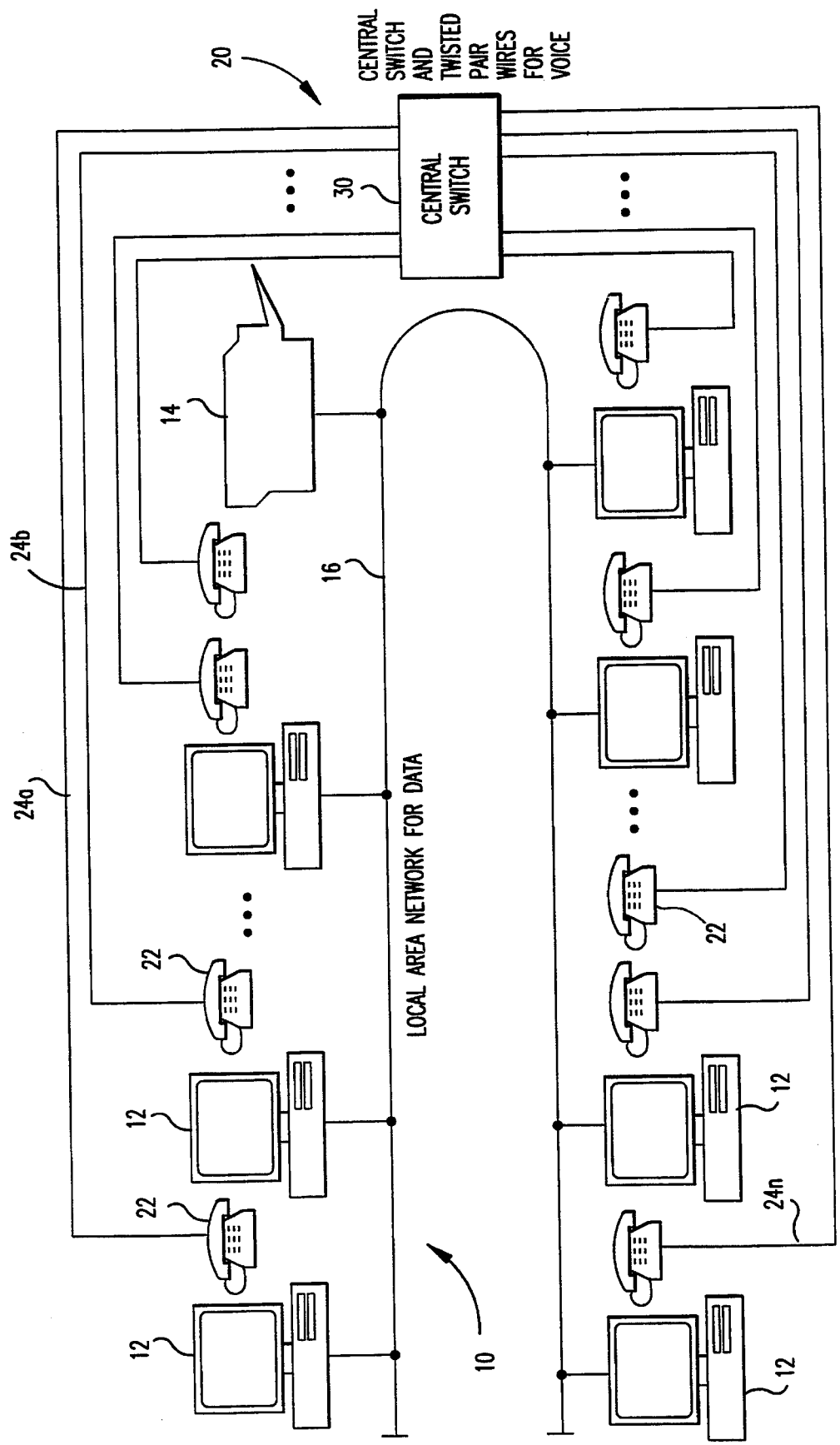
FIG. 1 is a schematic representation of a prior art communications network architecture.

Referring to FIG. 1, there is shown, a local area network and voice communication system of the prior art. In such systems, data from multiple terminals 12 are coupled together by means of a local area network 10, data being transmitted between any of the data terminals 12, or between any terminal 12 and the printer 14 over the bus 16. In prior art systems, the bus 16 may take any one of many forms, such as coaxial cable, twisted pair wires, optical fiber cable and the like. Individuals utilizing the terminals 12, are also in need of voice communication, and such is provided by means of the voice instruments 22, which are interconnected through a separate voice communications network 20. In network 20, each voice instrument 22 is coupled to a central switch 30 through an individual set of twisted pair cables 24a–24n. Such prior art systems have limited functionality, in that the data terminals 12 are isolated from the voice network 20, and thus cannot provide voice messages to any of the voice instruments 22, or receive and store messages therefrom. Further, such non-integrated systems are more expensive, in that there is a great deal of additional hardware required for two independent networks, as compared to the integrated multimedia network 100, shown in FIG. 2.

Figure 2:
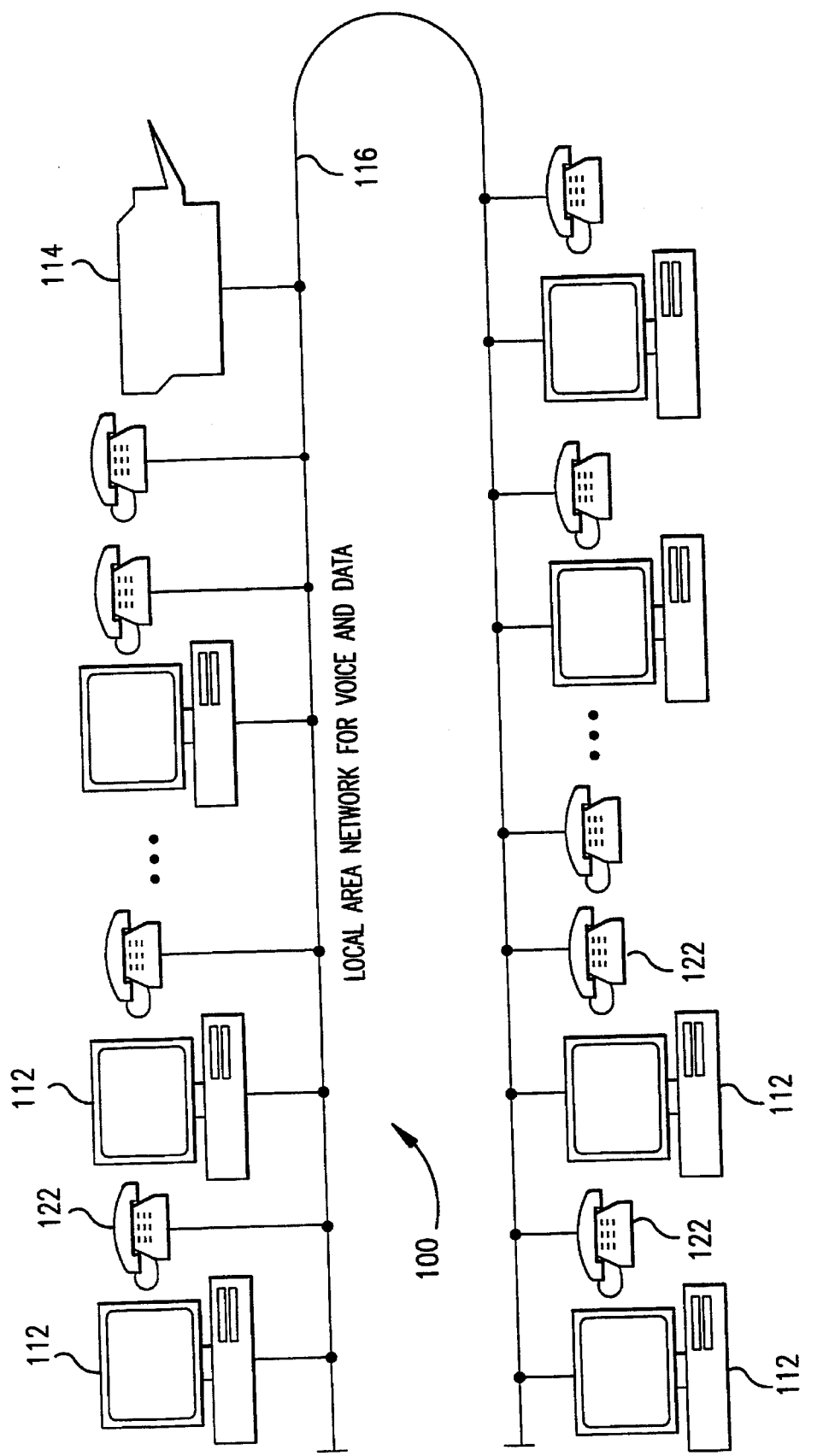
FIG. 2 is a schematic representation of a mixed voice and data communications network.

In FIG. 2, there is shown, the local area network for voice and data 100 wherein a plurality of data terminals 112, on printer 114 and a plurality of voice terminals 122 are all coupled to the communications channel 116. By virtue of the common communications channel 116, any of the data terminals 112 can communicate with any of the other data terminals 112, or the printer 114, and any of the voice instruments 122 can communicate with any of the other voice instruments 122. The communications channel 116 may be a hard wired communications bus, implemented by twisted wire pairs, coaxial cable, or optical cable. In the alternative, communications channel 116 may be an over-the-air broadcast channel using radio-frequency techniques. Further, if so equipped, the data terminals 112 can receive or transmit voice communications over the bus 116. The key to providing both voice and data communications on a common communications channel is the protocol used for accessing and utilizing the network resources. While some prior art multi-media networks utilize a central controller for allocating the network's resources, it is desirable from an end user standpoint to be able to randomly access the network on an as-required basis. Thus, the protocol must be able to handle the scheduling of the network users without any coordination therebetween, other than utilization of feedback from the communications channel.

Figure 4:
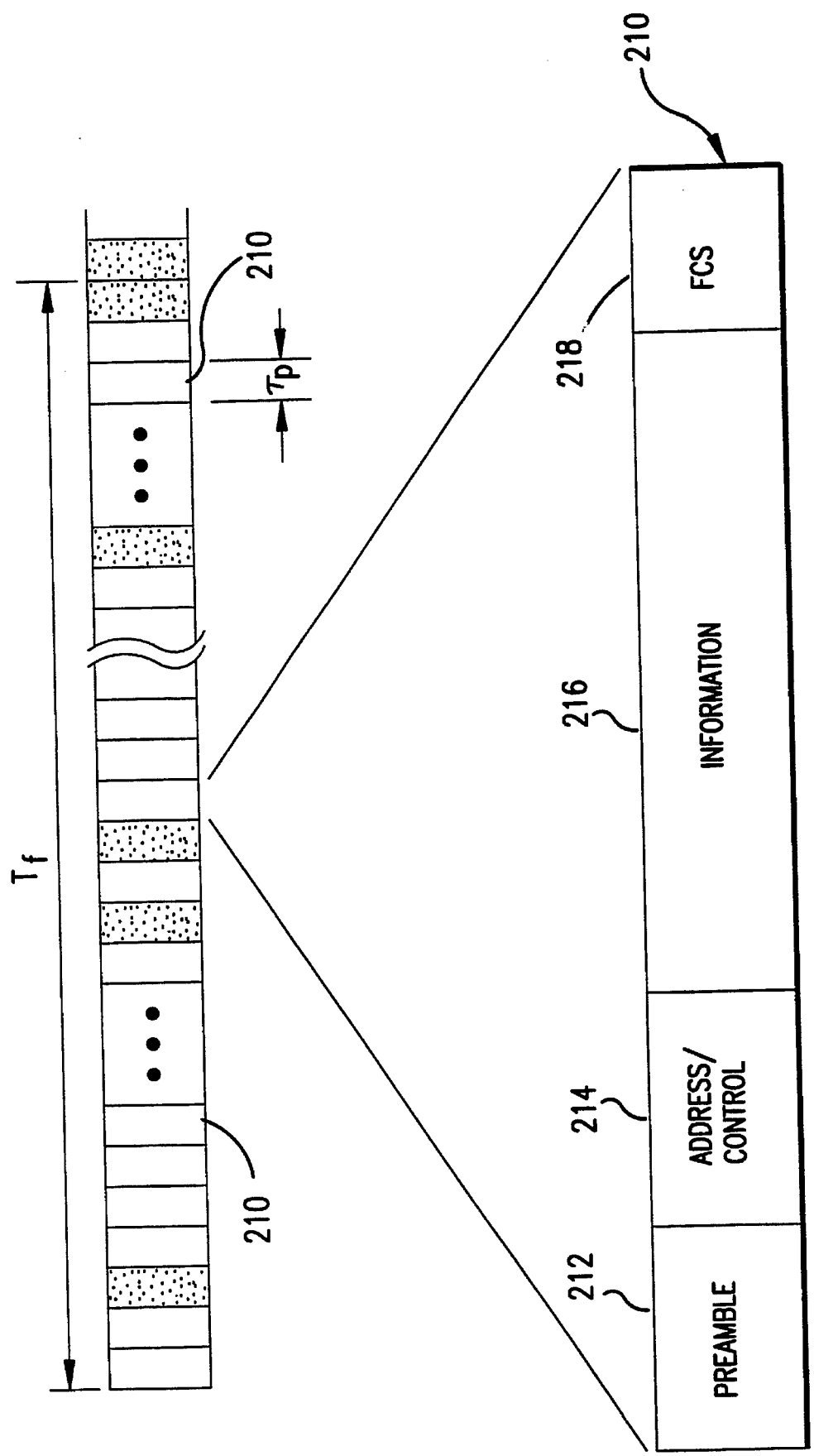
FIG. 4 is an illustration of the field allocation for an information packet of the present invention.

Local area network 100 is a broadcast type of bus architecture, without a central controller. Each user 112, 114, 122 monitors the bus to determine when the channel is free to be accessed, and then during such access monitors the channel to determine if another user simultaneously attempted to access the bus. Transmission over the bus is synchronous, with access being based on a time division multiplex (TDM) protocol. In the TDM protocol, a transmission frame of a fixed time period $T_f$ is subdivided into a predetermined number of time slots, each defining a discrete time period $\tau_p$, as depicted in FIG. 4. When the time slot is utilized by a data or voice terminal, the slot is filled by a plurality of bits sequentially transmitted from the terminal utilizing the time period defined by the slot 210. Each slot is subdivided into portions into which a predetermined number of bits are allocated, these bit allocations defining particular fields of the information packet being transmitted.

Each information packet includes a preamble 212, an address/control field 214, an information field 216, and a flag control/status field 218. The frame length ($T_f$) and the time slot duration ($t_p$), having been predetermined, are system wide constants. These values are integrated into the hardware configuration of the network interface communications hardware of each of the data and voice terminals. Thus, when a first terminal begins to transmit packets it establishes the frame timing of the communications channel and utilizes the first time slot thereof. Other terminals subsequently accessing the communications channel will synchronize themselves with the frame timing established by the first terminal, and utilize the remaining time slots of each frame according to the protocol which will be further described in following paragraphs.

Although the transmissions from each of the voice and data terminals utilize a synchronous TDM protocol, and thus are not truly accessing the communications channel in a random access fashion, the mixed voice and data protocol appears to be a random access to the users. Such appears to be random because all of the time slots are available to any of the users in that no predetermined number of slots are reserved for any particular classification of user. Each class of user is identified as having a predetermined priority, that priority being based on many factors, such as the amount of time delay which can be tolerated by the particular class of user.

If time delay is the most relevant factor for determining priority, then such class of users as those transmitting voice packets will be given a higher priority over those users transmitting data. However, certain classes of data, such as data transmitted for real-time operations, may be given a higher priority than other data transactions or possibly higher than voice packets. Thus, multiple classifications can be established based on whether the packets provide voice information, video information or various types of digital data. This established priority defines the access priority to the communications channel, with a higher priority user gaining access to the channel over a user of lower priority. The potential for data collisions, the simultaneous access to the communications channel by two or more terminals, is thereby reduced, as compared to a CSMA protocol. Each of the transmitting terminals monitors the communications channel to determine whether a particular slot is active or inactive. When it is established that a slot is inactive, the terminal begins transmission of the data packet, and simultaneously reads back that packet to determine if a collision has occurred, by comparing the data read back from the communications channel to determine if it has been corrupted. If a collision is detected between terminals having the same priority, each of the terminals whose data collided, will then subsequently retransmit their respective data packets, subsequent to a random delay time period (a delay equal to a random number of time slots).

Figure 5:
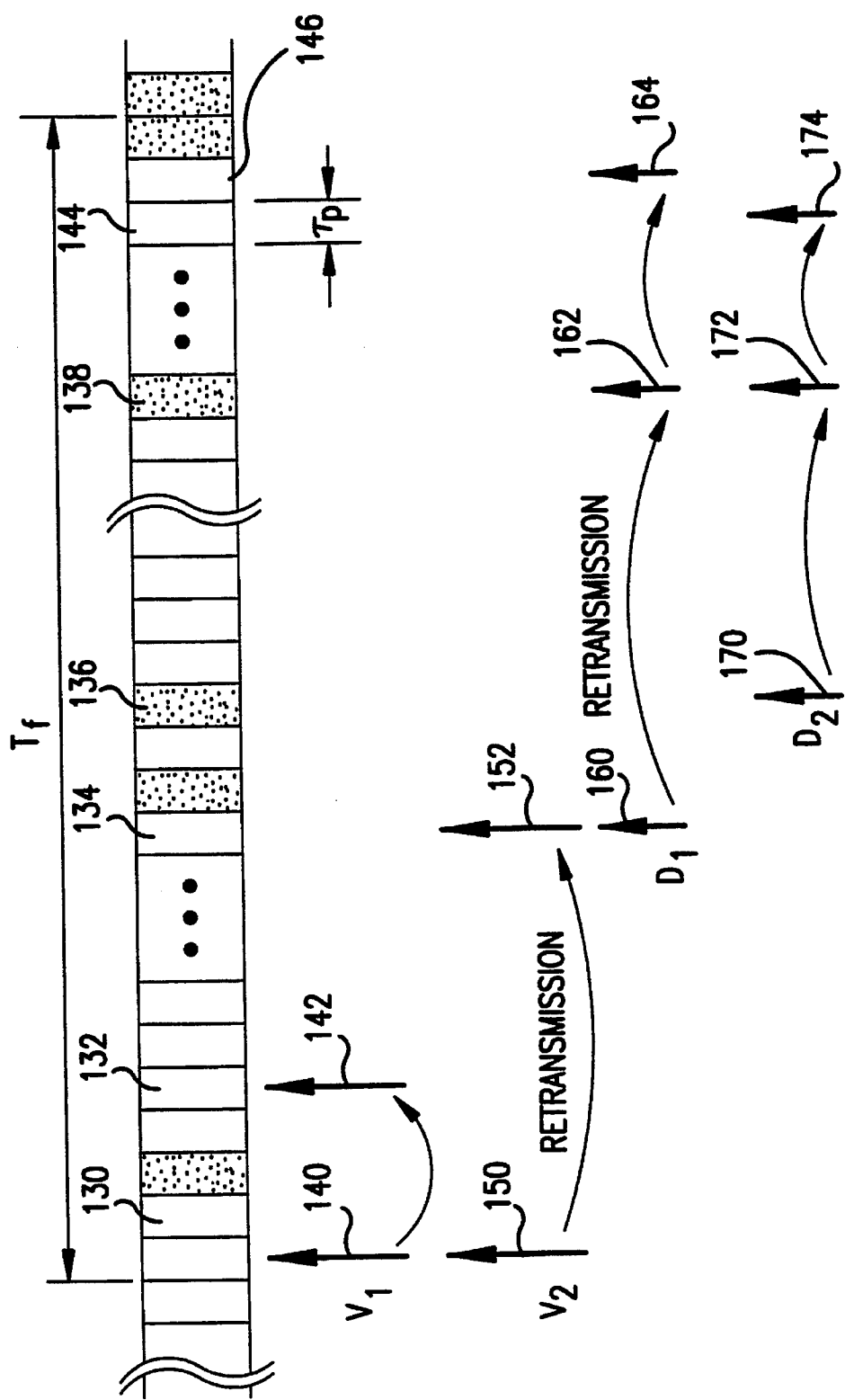
FIG. 5 is a schematic representation of scenarios of packet collisions and retransmissions in the present invention.

Referring now to FIG. 5, there is shown, a representation of the scenarios for packet collision and retransmission. For simplicity, the representation shown in the Figure assumes two classes of information packets, voice and data, with voice having a higher priority. Thus, when two voice terminals attempt to access the time slot 130 with the packets 140 and 150, a collision is detected and each terminal then subsequently retransmits the data packets as packets 142 and 152, respectively. The packet 142 accesses the slot 132, detects no collision, and utilizes the same relative time slot in each of subsequent transmission frames. Similarly, the packet 152 is able to access the unused slot 134. However, a first data terminal, having a packet 160 ready for transmission, detects the higher priority voice packet 152 during its preamble transmission, and thus must delay the retransmission a predetermined number of time slots. The voice packet 152 is undisturbed by the lower priority data packet 160, detected off the voice terminal during the transmission of its preamble, as will be further described in following paragraphs. Subsequently, a second data terminal prepares a data packet 170 for transmission, however, the terminal detects that the slot 136 is active, being utilized by another terminal, and thus must delay retransmission by a random number of time slots. The random delays of one of the two data terminals produce packets 162 and 172, both of which attempt access to the time slot 138, which each data terminal determines is unavailable, and thus each must retransmit their data packets by a delay of a random number of time slots, the first data terminal retransmitting the packet 164 into the time slot 146 and the second data terminal retransmitting the packet 174 into the time slot 144.

Of particular importance, is the ability to detect contention for a slot by a higher priority user, without corrupting the transmission thereof, as well as to quickly assess the status of a particular slot as being available or unavailable for access. It is therefore important that the preamble 212 of every information packet provide the feedback to each terminal of the status of the communications channel in addition to the synchronization bits typically included in the preambles of packetized data.

TABLE 1

Preamble bit allocation

| BITS | DEFINITION |
|---|---|
| 1–8: | Synchronization Bits |
| 9–11: | Channel Status Bits. Binary values can be assigned to indicated: |
| 000: | Slot is free |
| 001: | Slot is contended by data user |
| 010: | Slot is being used by a data user |
| 011: | Slot is contended by voice user |
| 100: | Slot is reserved by a voice user who is in a silence period |
| 111: | Slot is reserved by a voice user who is in talkspurt |
| 12–16: | Priority Bits |
| 1XXXX: | Voice traffic, where XXXX indicate individual address |
| 0XXXX: | Data traffic, where XXXX indicate individual address |

Figure 3:
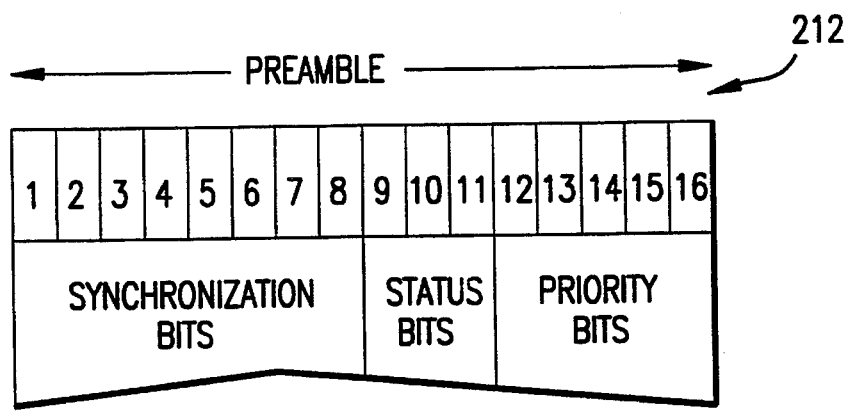
FIG. 3 is a diagram of the bit allocation for the preamble of the present invention.

A representative preamble is shown in FIG. 3, and the allocation of bits for the preamble is presented in Table 1. The first eight bits are utilized for synchronization, such schemes being well known in the art. The next three bits, bits 9–11, identify the status of the channel, whether the slot is free, being contended, or being used. Although three channel status bits are shown, such is not intended to be a limitation, as the number of bits utilized for that function are determined by the number of different classifications of data which need to be identified to the terminals monitoring the communications channel. The remaining bits 12–16 are identified as the priority bits, indicating the particular class of traffic and the individual address of the transmitting terminal, as an example. Thus, where a slot is indicated as being contended by a data terminal, a terminal having a lower priority will refrain from transmitting and similarly contending for the same slot, whereas a voice terminal, which has a higher priority than data, would be free to transmit and contend for the slot.

Figure 6:
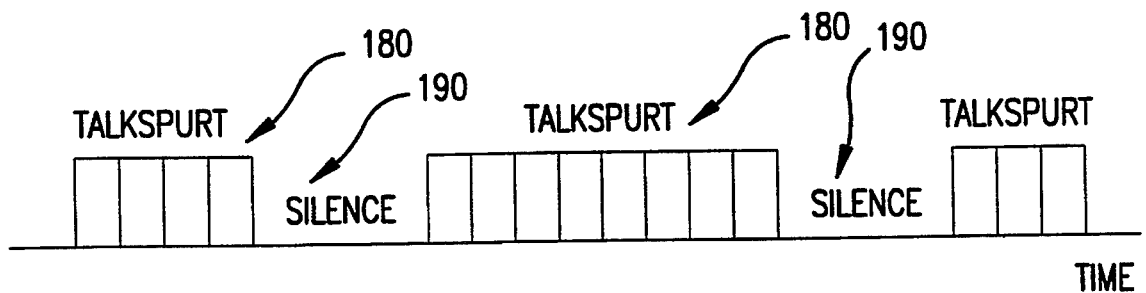
FIG. 6 is an illustration of voice data traffic density in the present invention; and, FIGS. 7 and 8 are block diagrams of the protocol of the present invention.

Another important feature of the protocol disclosed herein is the ability for information packet transmissions of data users to utilize slots which have been accessed and reserved by a voice user, but are currently in a silence period (no voice data is being transmitted in the particular frame). As shown in the representation of FIG. 6, a voice conversation is made up of a plurality of talk spurts 180 separated by silence periods 190. The silence periods 190 are time periods wherein no voice data is being transmitted by the particular voice terminal which has reserved an identified time slot. Such silence periods may last for several frames, which if not otherwise utilized would significantly waste the resources of the communications channel. Thus, if a time slot is identified as being reserved for a particular voice terminal's use, and in a talkspurt, then that slot is unavailable for use by any other terminal. On the other hand, if the status bits identify the slot as being reserved for a voice user, but such is in a silence period, a data terminal can make use of that time slot and corresponding time slots in subsequent frames which are similarly identified as representing a silence period, thereby increasing the throughput of the communications channel.

Another important concept is the means by which the channel status is quickly determined by the network's terminals. The preamble of different classes of users, use orthogonal codes, or separate and distinct modulation frequencies. If orthogonal coding is utilized, each class of user is assigned a particular one of several orthogonal codes, thereby allowing a user, while transmitting its own preamble, to sense the presence of preambles from other classes, and not interfere with such. Another means of achieving the ability to transmit a user's own preamble, while monitoring the communications channel for the preamble of another user is through the use of different modulation carrier frequencies for each class of user. Thus, information packets of voice users would be modulated on a carrier signal having a frequency $f_1$, while information packets from data users would be modulated on a second carrier signal having a frequency $f_2$. By utilizing distinct and separate frequencies for each class of user, or orthogonal codes, a user can begin transmitting a preamble, while simultaneously monitoring the status of the particular slot for the preambles of other users, halting transmission of the preamble if a higher priority user is detected.

Figure 7:
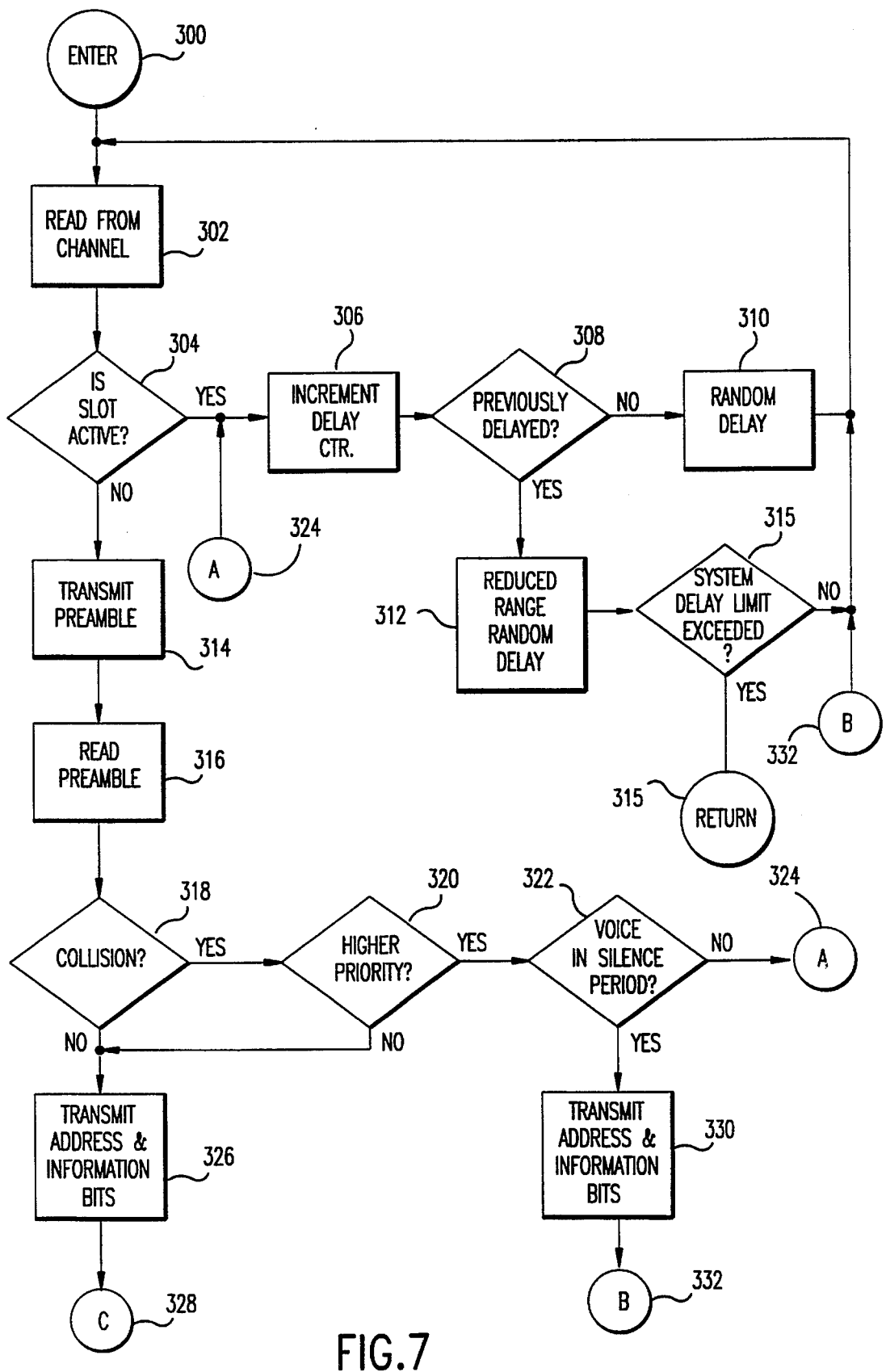
Figure 8:
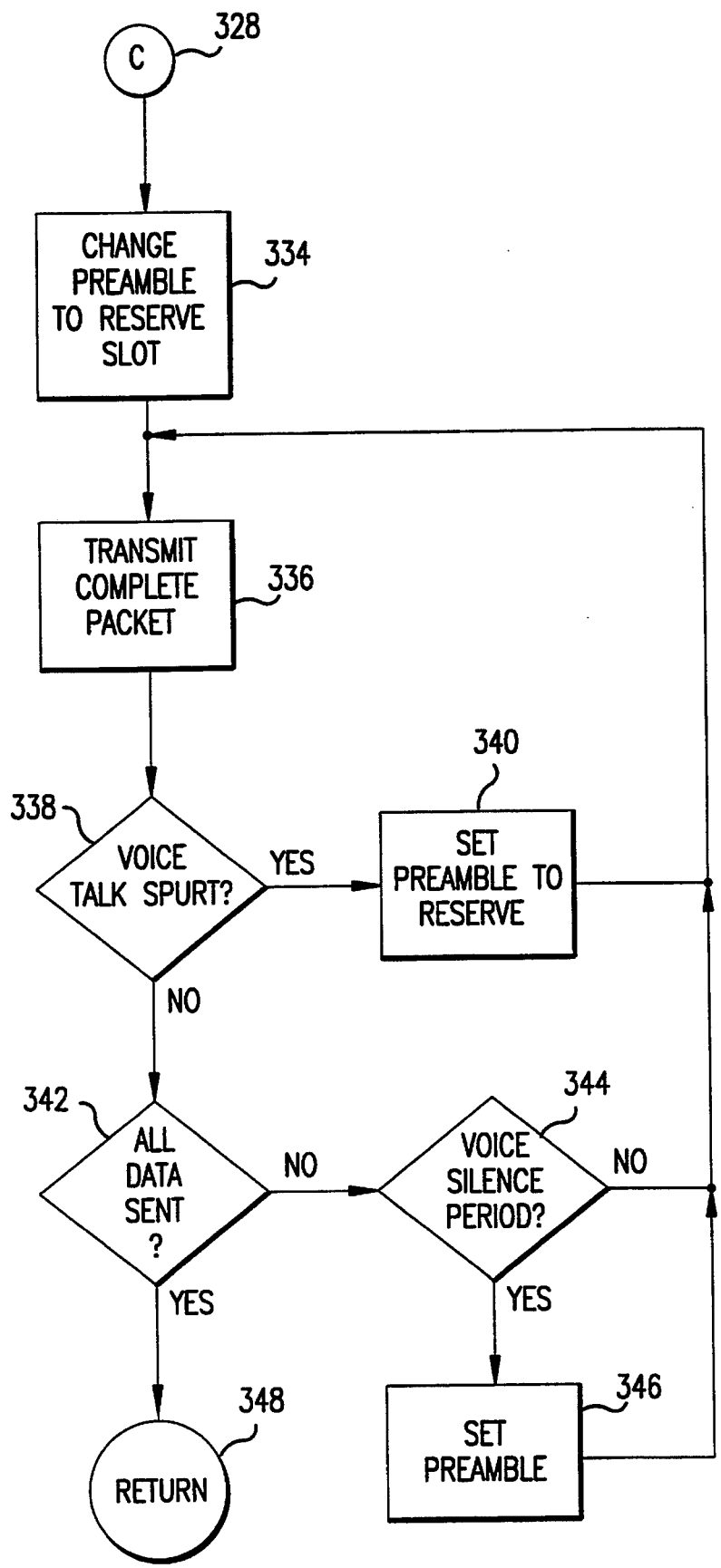

Referring now to FIGS. 7 and 8, there is shown, a flow chart of the protocol defining the method for randomly accessing a multi-media communications network, such network having a common signal path and a plurality of voice and data terminals coupled thereto. Beginning from the entry point 300, the flow passes to block 302 wherein a respective terminal reads from the communications channel. From block 302, the flow passes to the decision block 304, wherein it is determined whether the slot is active or not. If the slot is active, the flow passes to block 306 wherein a delay counter is incremented. Subsequent to incrementing the delay counter in block 306, the flow passes to decision block 308, wherein it is determined whether the intended transmission was previously delayed. If an attempt to transmit a packet had not been previously delayed, the flow passes to block 310 wherein retransmission is delayed by a random delay (pseudo-random). Subsequent to the random delay time period expiring, the flow passes back to block 302 and then to 304 for determining whether a slot is available.

In order to improve the throughput of the communications channel, on each successive attempt to access the data channel, the maximum delay which can be generated can be reduced, and such reduction could be as much as 50%. Thus, if in decision block 308 it is determined that the attempted access to a slot is already a retransmission of an attempted access (delay counter greater than one), then the flow passes to block 312 wherein a random delay having a reduced range is generated. Since a system may impose a delay limit on a certain class of users, the number of retransmission attempts of a user is dependent on the user's cumulative delay. The cumulative delay of the retransmitting user is compared to the system-defined delay limit in decision block 313. If the user's cumulative delay exceeds the system limit, the user is considered to be blocked by the system and returns to the pool of potential users to contend for available slots, as indicated by the flow from decision block 313 to the return block 315. If the system delay limit is not exceeded, the flow passes back to blocks 302 and 304, as previously described. As an example, if subsequent to a first transmission a random delay having the range of one to twelve time slots may be generated in block 310 on the first attempt to retransmit a packet. On the third attempt (the second retransmission), the range for the random delay may be reduced so as to range from one to six time slots in block 312. On a subsequent retransmission, the range for the random delay may be further reduced, provided the cumulative delay of the retransmitting user has not exceeded the system delay limit, as tested in decision block 313. Such further reductions may be to a maximum of three time slots, followed by a reduction to a delay of one or two time slots.

If it is determined in block 304 that the slot is not active, then the flow passes to block 314, wherein the terminal seeking access to the communication channel transmits its preamble. From block 314, the flow next passes to block 316, wherein the preamble just transmitted is read back, substantially simultaneous with the transmission thereof. Subsequent to the reading back of the Preamble, the flow passes to decision block 318, wherein it is determined whether a collision has occurred. If it has been determined that a collision has occurred, the flow passes to decision block 320 wherein it is determined whether the collision was with a user of equal of higher priority. If the collision was not with a user of equal or higher priority, the flow passes to block 326 to continue the transmission of the packet. If on the other hand, the collision was with a user having an equal or higher priority, the flow passes to decision block 322, to determine if the collision of a data user's packet was with a slot reserved for a voice user, who is in a silence period. If the voice user was not in a silence period, or both users are of equal priority, the flow passes to connection block 324 for entry into the retransmission loop, incrementing the delay counter in block 306.

In the alternative, if the reserved time slot indicates that the voice user is in a silence period, the flow passes to block 330 wherein the address and information bits which form the remaining portion of the packet are transmitted. Subsequent to the transmission of the address and information bits, the flow passes to connection block 332 for entry into the retransmission loop. The particular user having transmitted a packet in a slot reserved for a voice user, but which was in a silence period, must repeat the slot acquisition process from the beginning for subsequent data packets, since the time slot just utilized cannot be reserved for that user.

Referring back to decision block 318, if no collision is detected, the flow passes to block 326, wherein the address and information bits which complete the packet are transmitted. From block 326, the flow passes to the connection block 328 for passage of the flow to block 334. In block 334, the status bits of the preamble are changed to indicate that the time slot is reserved for the particular user which previously contended for and acquired the time slot. From block 334, the flow passes to block 336, wherein the next complete packet is transmitted in the reserved time slot. From block 336, the flow passes to the decision block 338, wherein it is determined whether a voice user is in a talkspurt. If a voice user is in a talkspurt, the flow passes from decision block 338 to block 340, wherein the status bits of the preamble are said to reserve the time slot and identify the user as being in a talkspurt. From block 340, the flow passes back to block 336.

If in decision block 338 it is determined that a voice user is not in a talkspurt, or that the user is not a voice user, flow passes to decision block 342. Decision block 342 determines whether all of the data has been sent. If all the data has been sent, the flow passes from decision block 342 to the return block 338, returning control of the processing to a main program. If all the data has not been sent, the flow passes from decision block 342 to decision block 344. Decision block 344 determines whether a voice user is in a silence period. If a voice user is not in a silence period, or the user is not a voice user, flow passes from decision block 344 back to the block 336. However, if the user is a voice user in a silence period, the flow passes from decision block 344 to block 346, wherein the preamble is set accordingly, indicating the slot is to remain reserved for a voice user, but is currently in a silence period. From block 346, the flow passes back to block 336. Where the voice user is in a silence period, the complete packet which is sent consists only of a preamble, indicating the status of the voice user as being in a silence period, thereby allowing data users to utilize the time slot for transmission of its address and information bits therein.

Although this invention has been described in connection with specific forms and embodiments thereof, it will be appreciated that various modifications other than those discussed above may be resorted to without departing from the spirit or scope of the invention. For example, equivalent elements or steps may be substituted for those specifically shown and described, certain features may be used independently of other features, and in certain cases, particular locations of elements or sequence of steps may be reversed or interposed, all without departing from the spirit or scope of the invention as defined in the appended claims.

What is claimed is:

1. A method for randomly accessing a multimedia communications network defined by a common signal path and a plurality of voice and data terminals coupled to said common signal path for communication thereon, comprising the steps of:

a. defining repetitive frames in said common signal path, each frame comprising a plurality of time slots for transmission of information packets by said voice and data terminals;

b. allocating a portion of each of said time slots for an access field, an address-control field, and an information field of a respective information packet;

c. monitoring each of said plurality of time slots for an access field identifying a null time slot, said null time slot being defined by a time slot that is identified as being (1) not used by any of said voice or data terminals, or (2) reserved for a voice terminal in a silence period;

d. transmitting a preamble in an access field of said identified null time slot;

e. monitoring said transmission of said preamble for collisions between terminals competing for said identified null time slot;

f. transmitting address data and information bits in said respective fields of said identified null time slot and a respective time slot in subsequent fames when no collision is detected; and, g. repeating steps c through g subsequent to a random delay when a collision is detected.

2. The method of claim 1 where the step of monitoring said transmission includes the step of reading back said preamble from said common signal path substantially simultaneous with said transmission of said preamble.

3. The method of claim 1 where the step of transmitting a preamble includes the step of concatenating synchronization bits with channel status bits to form said preamble.

4. The method of claim 1 where the step of transmitting a preamble includes the step of concatenating a plurality of synchronization bits with a plurality of channel status bits and at least one priority bit to form said preamble.

5. The method of claim 4 where the step of concatenating includes the step of selecting a predetermined sequence of said channel status bits to indicate said null time slot has been transformed to reserved time slot.

6. The method of claim 4 where the step of concatenating includes the step of selecting a predetermined sequence of said channel status bits to indicate said null time slot has been transformed to a reserved time slot.

7. The method of claim 6 where the step of concatenating includes the step of setting said priority bit to indicate that said information field contains first data when one of said data terminals is accessing said common signal path.

8. The method of claim 6 where the step of concatenating includes the step of setting said priority bit to indicate that said information field contains second data when one of said voice terminals is accessing said common signal path.

9. The method of claim 8 where the step of concatenating includes the step of selecting a third sequence of said channel status bits to indicate said reserved time slot is available for limited use by a data terminal responsive to detection of a silence period of said voice terminal.

10. The method of claim 1 where the step of transmitting a preamble includes the step of transmitting said preamble using orthogonal codes to distinguish a voice terminal from a data terminal.

11. The method of claim 1 where the step of transmitting a preamble includes the step of transmitting said preamble from a voice terminal using a first carrier signal having a first predetermined frequency and transmitting said preamble from a data terminal using a second carrier signal having a second predetermined frequency.

12. A system incorporated into voice and data terminals for communication according to a protocol for mixed voice and data access to a synchronous broadcast communications channel, said synchronous broadcast communications channel having a plurality of time division frames for communication of packetized information between a plurality of said voice and data terminals communicatively coupled one to another by said broadcast communications channel, each of said plurality of time division frames being subdivided into a plurality of time slots, each of said voice and data terminals comprising:

means for determining whether one of said plurality of time slots of a time division frame is available for use;

means for transmitting a preamble on said broadcast communications channel responsive to said determining means identifying a time slot available for use and substantially simultaneously monitoring said broadcast communications channel for detecting a collision of said preamble with a transmission from another one of said voice and data terminals;

means for transmitting address data and information bits responsive to an absence of collisions being detected by said transmission and monitoring means; and, means for retransmitting said preamble subsequent to a time delay responsive to a collision being detected by said transmission and monitoring means.

13. The system as recited in claim 12 where said means for transmitting preamble includes means for coding said preamble with an orthogonal code.

14. The system as recited in claim 12 where said means for transmitting a preamble includes means for modulating a carrier signal having a predetermined frequency with said preamble, said carrier signal frequency being selected responsive to a type of data being transmitted.

15. The system as recited in claim 12 where said means for transmitting a preamble includes means for indicating silence periods in communications between voice terminals, wherein a time slot indicated as reserved for a voice terminal and in a silence period is usable by a data terminal.

* * * * *